United States Patent [19]
Holderegger et al.

[11] Patent Number: 4,940,354
[45] Date of Patent: Jul. 10, 1990

[54] MOUNTING DEVICE FOR MOUNTING A SQUEEGEE OR INKING BLADE IN A PRINTING PRESS

[75] Inventors: Jürg Holderegger, Im Altmoos, CH-8450, Datwil; Dionizy Simson, Winterthur, both of Switzerland

[73] Assignee: Jürg Holderegger, Datwil, Switzerland

[21] Appl. No.: 207,165

[22] Filed: Jun. 15, 1988

[30] Foreign Application Priority Data

Jul. 6, 1987 [CH] Switzerland ........................ 02559/87

[51] Int. Cl.5 ........................ F16B 17/00; B41F 15/42
[52] U.S. Cl. .......................................... 403/5; 403/31; 403/373; 101/169; 15/256.51
[58] Field of Search ................. 403/31, 5, 15, 34, 373; 101/169, 155, 157; 15/256.51

[56] References Cited

U.S. PATENT DOCUMENTS 3,930,445 1/1976 Jaffa ................................ 101/169 X
4,241,691 12/1980 Hopfe et al. ................. 15/256.51 X
4,329,936 5/1982 Heist et al. ...................... 101/169 X
4,612,796 9/1986 Smyth, Jr. .......................... 403/5 X
4,665,859 5/1987 Dunlap et al. ............... 15/256.51 X

FOREIGN PATENT DOCUMENTS 2500764 7/1975 Fed. Rep. of Germany ...... 101/169
1339672 12/1973 United Kingdom .................. 403/31

*Primary Examiner*—Peter M. Cuomo
*Attorney, Agent, or Firm*—Kenyon & Kenyon

[57] ABSTRACT

The mounting device for the squeegee or inking blade has an elastic clamping tube which can be expanded under a pressurized medium to clamp the squeegee or inking blade in place. The clamping tube is made of resilient material and ensures that the squeegee or inking blade is secured with a uniform linear pressure over the whole length. A spting may also be used to initially hold the squeegee or linking plate in place until the clamping tube is expanded.

20 Claims, 3 Drawing Sheets

MOUNTING DEVICE FOR MOUNTING A SQUEEGEE OR INKING BLADE IN A PRINTING PRESS

This invention relates to a mounting device for mounting a squeegee or inking blade in a printing press.

As is known, a wide variety of materials can be printed by a screen printing process in which an inking blade first distributes ink on a screen which is stretched tightly in a frame and, whereafter, a squeegee forces the ink through the screen onto the material to be printed. Various mechanisms have also been known for securing a squeegee to a printing press of this type. For example, it has been known to mount a squeegee, which is usually made of plastics of different hardness and resilience, in a clamped manner between two metal section members which are pressed together by a relatively large number of threaded connections distributed over the length of the squeegee. However, considerable labor is required in order to change over a squeegee since the many threaded connections must be loosened for this purpose.

Pneumatic systems have also been known for the mounting of a squeegee in which a pressing beam is disposed in parallel to the squeegee. In this case, the pressing beam acts on the squeegee by way of pressing cylinders and pistons which are distributed over the length of the pressing beam in order to clamp the squeegee in place. Such a pneumatic system is described in the prospectus entitled "Ein Meilenstein fur den Siebdrunk, "RKS"-Rakel" of the company RK-Siebdrunk GmbH, of Bergisch Galdbach, Federal Republic of Germany. However, this construction is an elaborate one requiring a compressed air supply and a permanent connection thereto. Also, the rigid pressing beam makes it impossible to even out irregularities in local clamping forces and on the clamping surfaces, for example, due to damage to the surfaces, to the extent necessary for uniform distribution of the clamping force over the whole length of the squeegee.

Accordingly, it is an object of the invention to provide a squeegee mounting device for a printing press which can be produced and handled simply and readily.

It is another object of the invention to simplify the mounting device for a squeegee and/or inking blade in a printing press.

It is another object of the invention to ensure a uniform linear clamping force over the whole length of a mounted squeegee.

It is another object of the invention to obviate distortions in the mounting of a squeegee or inking blade due to local differences in clamping forces.

It is another object of the invention to provide a relatively simple mounting device for the mounting of a squeegee and/or inking blade in a printing press.

Briefly, the invention provides a mounting device for mounting one of a squeegee and an inking blade in a printing press. The device is comprised of a hollow section member having a shaped internal recess for receiving the squeegee and/or inking blade, a wall bounding the recess and a longitudinal groove opposite the wall and in communication with the recess. In addition, the mounting device includes a pressure-tight elastic clamping tube disposed in the groove of the hollow section. This tube includes a pressure retaining valve and is expandable under a pressurized medium into the recess in order to press the received squeegee and/or inking blade against the wall.

The clamping tube extends over the whole length of the squeegee and produces a uniform clamping force because of the resilient nature of the tube. Thus, irregularities on the clamping surface are compensated by resilient deformations of the tube which engages the squeegee. By means of a pressure gas or liquid supply means, such as a pump, any required pressure up to a maximum pressure determined by the material and the construction of the tube can be produced therein due to the use of the pressure-retaining valve. After the required pressure has been produced, the tube is isolated from the pressure source so that the mounting device does not need to be permanently connected to a compressed air system.

Advantageously, the clamping tube has a substantially rectangular cross-section with a relatively rigid front wall facing the recess of the hollow section as well as a pair of corrugated side walls which are able to concertina in the manner of a bellows when in the unloaded state.

A bent spring strip may also be provided in the recess of the hollow section in facing relation to the wall in order to initially clamp a received squeegee and/or inking plate therebetween. This greatly facilitates assembly or replacement of a squeegee or inking blade. Because of the resilient bias which is provided, the spring keeps the squeegee or blade lightly engaged with the wall when the clamping tube is being filled with pressure medium or emptied.

In order to adapt to different spar constructions, the hollow section has a plurality of stepped seating surfaces on one side which are adapted to receive spars of different widths.

The mounting device is also provided with fixing stirrups, each of which is able to engage in a longitudinal slot in each of two side flanks of the hollow section in order to secure the hollow section to a spar. Advantageously, the stirrups may also be operative as hand grips for hand printing.

In order to provide a simple means of ensuring that a squeegee or inking blade is positioned at the correct distance from a screen in assembly, the shaped internal recess of the hollow section has a locating stop for the squeegee or blade.

The squeegee which is received in the hollow section may be of a laminated construction having a central plastics reinforced core, for example, a net-like or fabric-like core as well as an elastomer coating on each side of the core. In addition, the squeegee may be of rectangular cross-section shape with four corners defining pressing edges. Such a squeegee may have a very long working life before requiring regrinding. Advantageously, in this respect, the outside surface of the elastomer coatings are formed symmetrically of a transverse center plane and of a longitudinal center plane. In addition, grooves are provided within the elastomer coating to provide locating edges for positioning of the squeegee within the hollow section. In this respect, the locating stop of the hollow section may be abutted against such a locating edge.

The rigidity of a squeegee can be varied by variation of the materials from which the squeegee is made, the thickness of the squeegee and/or the mesh sizes of the reinforced core.

The inking blade may be constructed to include a box section member sized to be received within the recess of the hollow section as well a blade which extends eccentrically from the box section. Thus, the inking blade can be assembled in two different positions. In one position, for example by way of the "back" of the blade, the eccentrically mounted blade may be used to distribute a relatively large amount of ink on a screen. In this position, the blade is directed rearwardly relative to the direction of movement of the blade. However, when the blade is directed forwardly, some of the ink may be taken up to, thus, reduce the quantity of ink distributed on the screen. In either position, an edge of the box member may be used to engage the locating stop on the wall of the hollow section.

These and other objects and advantages of the invention will become more apparent from the following detailed description taken in conjunction with the accompanying ,drawings wherein.

Figure 1:
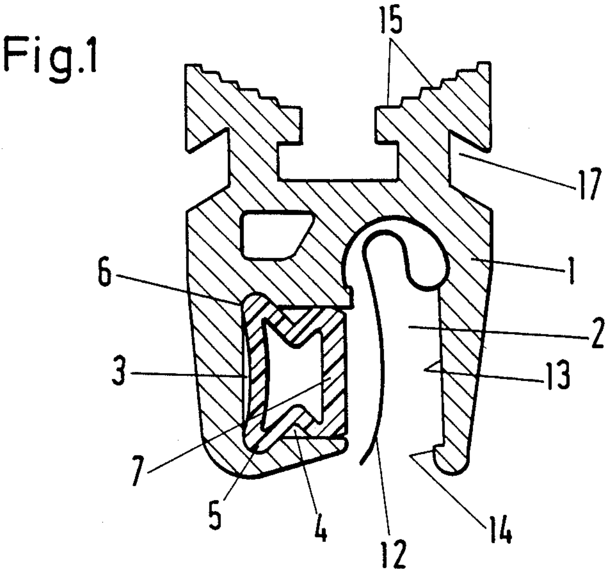
FIG. 1 illustrates a hollow section of a mounting device constructed in accordance with the invention.
Figure 4:
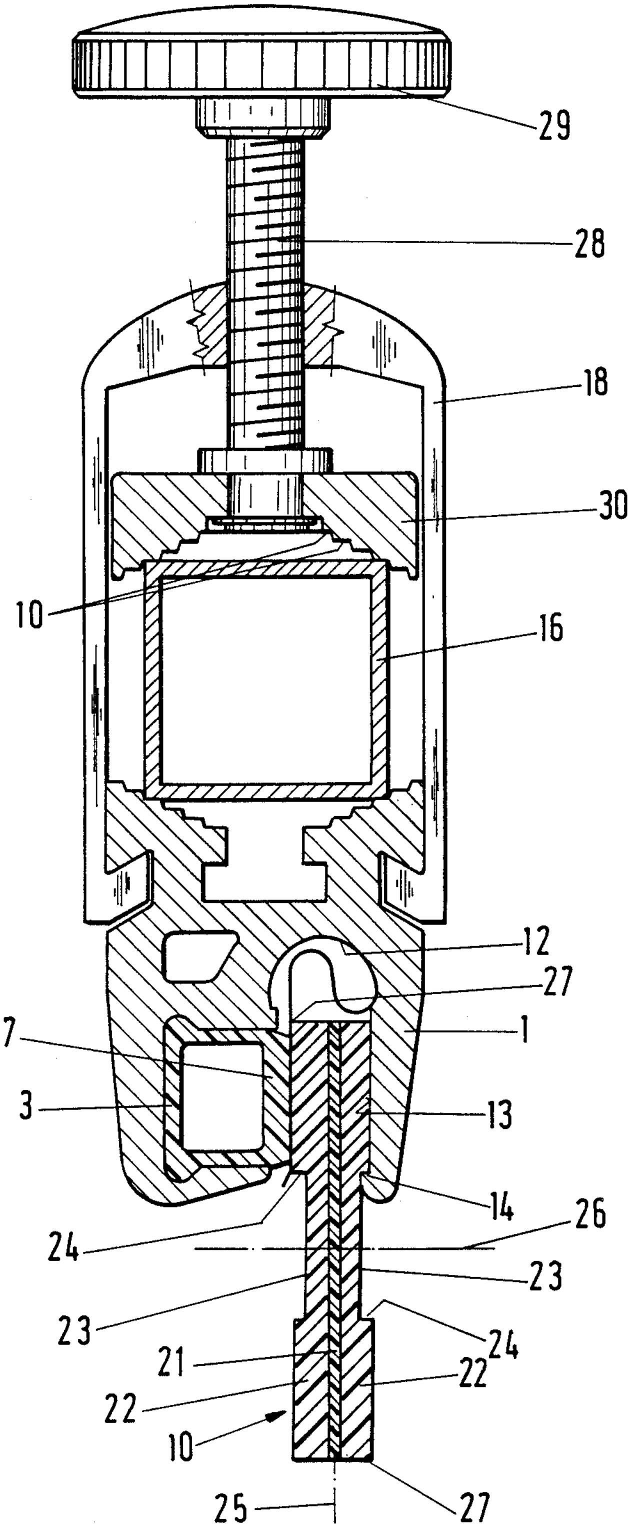
FIG. 4 illustrates a cross sectional view of the mounting device on a spar in accordance with the invention.

Referring to FIGS. 1 and 4, the mounting device includes a hollow section member 1 which has a shaped internal recess 2 as well as a longitudinal groove 4 which is in communication with the recess 2 and which is adapted to receive a clamping tube 3.

As indicated in FIG. 1, the longitudinal groove 4 has a base which is formed with relieved parts 5. In addition, the clamping tube 3 which is made of a pressure-type elastic material has two bead-like thickenings 6 which engage within the relieved parts 5. The tube 3 has a substantially rectangular cross-section with a relatively rigid and thick front wall 7 facing the recess 2 as well as a pair of corrugated side walls. The front wall 7 is such as to yield to local unevenness whereas the rear wall of the tube and the side walls are readily deformable. As can be determined from FIGS. 1 and 4, the corrugated side walls of the tube 3 act in the form of a bellows or concertina to flatten against the walls of the groove 4 when the tube 3 is pressurized. When unloaded, the side walls take up the corrugated state indicated in FIG. 1.

Figure 2:
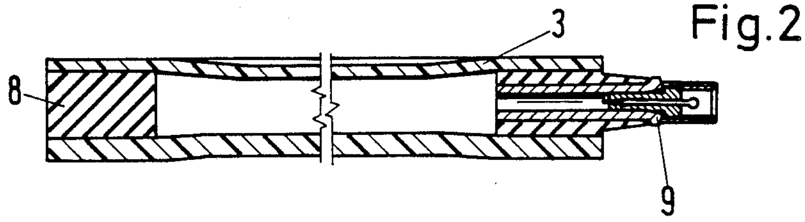
FIG. 2 illustrates a longitudinal sectional view of a clamping tube constructed in accordance with the invention.

Referring to FIG. 2, the clamping tube 3 is closed in gas-tight manner at both ends by means of vulcanized rubber plugs 8. In addition, a pressure retaining valve 9, such as a commercially available valve for a motor vehicle tire, is disposed at one end for the introduction and exhaust of a pressure medium, such as air.

Figure 3:
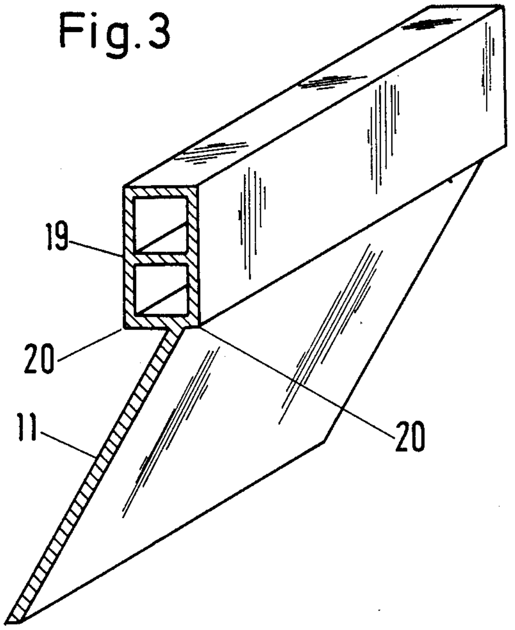
FIG. 3 illustrates a perspective view of an inking blade constructed in accordance with the invention.

Referring to FIG. 1, the longitudinal recess 2 of the hollow section 1 is opened at the bottom and is of a width to receive a squeegee 10 as shown in FIG. 4 and/or an inking blade 11 as shown in FIG. 3 in a direction perpendicular to the longitudinal axis of the recess 2. In addition, the recess 2 receives a continuous spring strip 12 or a plurality of discrete spring strips of like shape which, when unstressed, in shape resemble an S and which extend into the squeegee-receiving zone of the recess 2. The function of the spring 12 is to retain an inserted squeegee 10 or blade 11 until the tube 3 has been pressurized and can press on the element to be secured in place.

A wall 13 of the recess 2 facing the clamping tube 3 carries a locating stop 14 at the mouth of the recess 2.

The hollow section 1 has a plurality of stepped seating surfaces 15 on the side opposite from the recess 2 which widen in increments of five millimeters to receive spars of different widths.

Referring to FIG. 3, the inking blade 11 includes a box section 19 which is sized of a width less than the width of the recess 2 to be received within the recess 2 of the hollow section 1 as well as a blade which extends eccentrically from the box section 19. As indicated, the box section 19 has bottom edges 20 which are adapted to engage the stop 14 of the hollow section 1 when the inking blade 11 is assembled therein. Since the edges on either side of the inking blade 11 are identical, the blade can be fitted so as to be bent "rearwardly" or "forwardly" relative to the direction of movement so as to vary the quantity of ink introduced onto a screen (not shown) of a printing press.

Referring to FIG. 4, the squeegee 10 is of laminated construction having a central plastics reinforced core 21 and an elastomer coating 22 on each side of the core 21. The core 21 may be made of a net-like or fabric-like material. Each coating 22 is provided with a groove 23 having two locating edges 24. In addition, the squeegee 10 is formed symmetrically of a longitudinal center plane 25 as well as symmetrically of a transverse center plane 26. Consequently, pressing edges 27 arise at four corners of the squeegee so that the working life of the squeegee can be made, for example four times that of a conventional construction.

The locating edges 24 of the squeegee act in cooperation with the stop 14 of the hollow section 1 in order to ensure that all four edges 27 always return to the correct position relative to a screen (not shown) when the squeegee 10 is rotated or turned round.

Referring to FIG. 4, the squeegee 10 is assembled by being pushed up from below into the recess 2 against the spring 12 until an edge 24 "catches" on the stop 14. During this time, the clamping tube is in the unloaded shape shown in FIG. 1.

Once introduced, the squeegee 10 is retained by the spring 12 until the clamping tube 3 is supplied with a pressure medium so that the front Wall 7 presses the squeegee 10 onto the wall 13, for example, at a pressure of a few bars. Because of the resilient nature of the clamping tube 3, the squeegee 10 is pressed uniformly over the whole length.

The pressure within the clamping tube 53 is retained by the valve 9 (see FIG. 2) without the need for a permanent connection of the tube 3 to a pressure source.

In order to demount the squeegee 10, the pressure in the tube 3 is first reduced. Thereafter, the squeegee 10 is withdrawn downwardly from the recess 2.

The inking blade of FIG. 3 is mounted and demounted in a similar manner to the squeegee 10.

Figure 5:
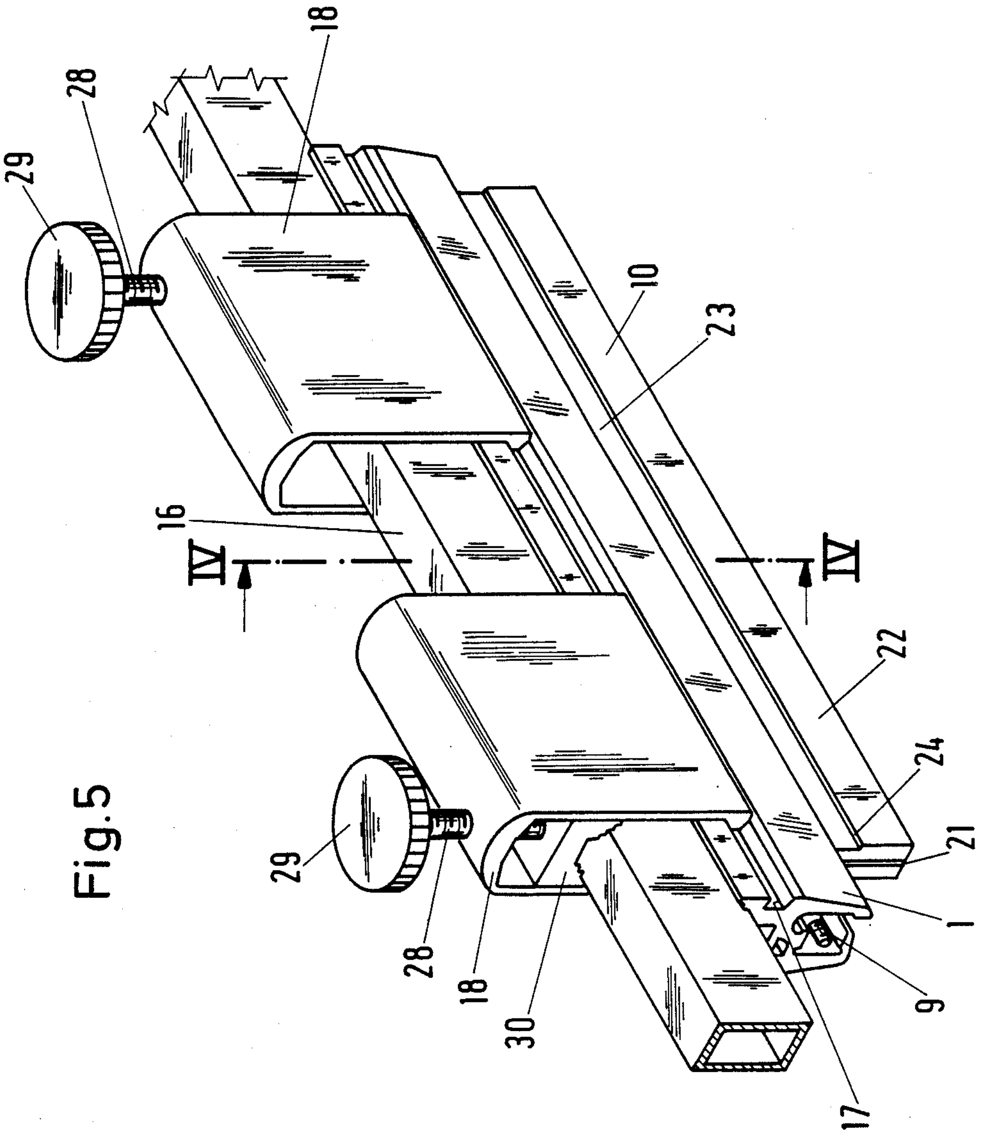
FIG. 5 illustrates a perspective view of the mounting device on a spar of a screen printing press.

Referring to FIG. 5, the mounting device includes a pair of stirrups 18 for engaging the hollow section 1 on opposite sides thereof for mounting about a spar 16. In this respect, each stirrup 18 has a pair of legs which engage in longitudinal slots 17 on opposite sides of the hollow section 1 and straddle the spar 16. In addition, a clamping block 30 is disposed within each stirrup 18 for engaging against the spar 16 on a side opposite the hollow section 1. Each clamping block 30 is mounted on a screw threaded spindle 28 which is threaded through the stirrup 18 and carries a knurled knob 29 at the upper end, as viewed. The clamping block 30 may be releasably secured to the bottom of the spindle 28 and, as the hollow section 1, has stepped seating surfaces for seating the spar 16. By tightening the spindle 28, the spar 16 is clamped between the clamping block 30 and the hollow section member 1.

As indicated in FIG. 5, the stirrups 18 are placed on top of the spar 16 and introduced lengthwise from the sides into the slots 17 of the hollow section member 1.

The fixing stirrups 18 may be shaped, as indicated in FIG. 5, so as to be used as hand grips for hand printing.

The invention thus provides a mounting device for the mounting of a squeegee and/or inking blade in a printing press which is of relatively simple construction.

Further, the invention provides a mounting device which utilizes a pressure-tight elastic clamping tube which is able to compensate for irregularities in the clamping surfaces so that the squeegee or inking blade can be held in a uniform clamped manner.

The invention also provides a mounting device in which the risk of distortion of a squeegee due to local unevenness is obviated.

What is claimed is:

1. A mounting device for mounting one of a squeegee and an inking blade in a printing press, said device comprising a hollow section member having a shaped internal recess on a longitudinal axis for receiving one of a squeegee and inking blade in a direction perpendicular to said longitudinal axis, a wall laterally bounding the recess and a longitudinal groove opposite said wall and in communication with said recess; and a pressure-tight elastic clamping tube disposed in said groove and having a pressure retaining valve therein, said tube being expandable under a pressurized medium laterally into said recess to press the received one of said squeegee and inking blade laterally against said wall.

2. A mounting device as set forth in claim 1 wherein said tube has a substantially rectangular cross-section with a relatively rigid front wall facing said recess and a pair of corrugated side walls.

3. A mounting device as set forth in claim 1 which further comprises a bent spring strip in said recess and facing said wall for initially clamping a received one of the squeegee and inking plate therebetween.

4. A mounting device as set forth in claim 1 wherein said hollow section has a plurality of stepped seating surfaces on one side for seating of a spar thereon.

5. A mounting device as set forth in claim 1 wherein said hollow section has a longitudinal slot in each of two side flanks and at least one fixing stirrup engaged in said slot for securing said hollow section to a spar.

6. A mounting device as set forth in claim 5 wherein said stirrup defines a hand grip for hand printing.

7. A mounting device as set forth in claim 1 wherein said recess has a locating stop for one of the squeegee and inking blade.

8. A mounting device as set forth in claim 1 wherein said tube has a relatively rigid wall facing said wall of said hollow section for clamping one of the squeegee and inking blade therebetween.

9. A mounting device as set forth in claim 8 which further comprises a bent spring strip in said recess and facing said wall for initially clamping a received one of the squeegee and inking plate therebetween.

10. A mounting device as set forth in claim 1 which further comprises a pair of stirrups engaging said hollow section on opposite sides thereof for mounting about a spar and a clamping block within each stirrup for engaging against a spar on a side opposite said hollow section.

11. In combination a hollow section member having a shaped internal recess having a predetermined width, a wall laterally bounding said recess and a longitudinal groove opposite said wall and in communication with said recess;

an elastic clamping tube disposed in said groove, said tube being expandable under a pressurized medium laterally into said recess; and a squeegee of less width than said width of said recess received in and projecting from said recess, said squeegee being disposed in clamped relation between said tube in an expanded state thereof and said wall.

12. The combination as set forth in claim 11 wherein said wall has a stop at a mouth of said recess and said squeegee has a groove receiving said stop with said tube in said expanded state.

13. The combination as set forth in claim 11 wherein said squeegee is of laminated construction having a central plastics reinforced core and an elastomer coating on each side of said core.

14. The combination as set forth in claim 13 wherein each coating has a groove therein for receiving a stop of said wall.

15. The combination as set forth in claim 14 wherein said squeegee is formed symmetrically of a transverse center plane and symmetrically of a longitudinal center plane.

16. The combination as set forth in claim 13 wherein said squeegee is of rectangular cross-section shape with four corners defining respective pressing edges.

17. The combination as set forth in claim 11 which further comprises a spring strip in said recess facing said wall to initially clamp said squeegee therebetween.

18. In combination a hollow section member having a shaped internal recess having a predetermined width, a wall laterally bounding said recess and a longitudinal groove opposite said wall and in communication with said recess;

an elastic clamping tube disposed in said groove, said tube being expandable under a pressurized medium laterally into said recess; and an inking blade of less width than said width of said recess received in and projecting from said recess, said blade disposed in clamped relation between said tube in an expanded state thereof and said wall.

19. The combination as set forth in claim 18 wherein said inking blade includes a box section member in said recess and a blade extending eccentrically from said box section.

20. The combination as set forth in claim 19 wherein said wall has a stop at a mouth of said recess abutting said box section to retain said box section in said recess with said tube in said expanded state.

* * * * *